United States Patent [19]

Berghof et al.

[11] 4,192,985
[45] Mar. 11, 1980

[54] METHOD FOR THE PRODUCTION OF INTEGRATED MAGNETIC HEAD STRUCTURES

[75] Inventors: Winfried Berghof, Taufkirchen; Alfred Pichler, Munich, both of Fed. Rep. of Germany

[73] Assignee: Siemens Aktiengesellschaft, Berlin & Munich, Fed. Rep. of Germany

[21] Appl. No.: 833,487

[22] Filed: Sep. 15, 1977

[30] Foreign Application Priority Data

May 11, 1977 [DE] Fed. Rep. of Germany ....... 2721201

[51] Int. Cl.² .................................................. B23K 9/00
[52] U.S. Cl. ............................... 219/121 EM; 29/603
[58] Field of Search ................. 219/121 EB, 121 EM; 29/603

[56] References Cited

U.S. PATENT DOCUMENTS

| 3,514,851 | 6/1970 | Perkin et al. | 29/603 |
| 3,846,842 | 11/1974 | Lazzari | 360/126 |
| 4,016,601 | 4/1977 | Lazzari | 360/119 |
| 4,017,965 | 4/1977 | Brutsch et al. | 29/603 |

OTHER PUBLICATIONS

Electronics Review, 6/76 pp. 31 & 32.
Integrated Mag. Recording Heads, Lazzari et al. 3/71, Transactions on Magnetics, vol. Mag-7, #1, pp. 146–150.

*Primary Examiner*—Bruce A. Reynolds
*Assistant Examiner*—M. Paschall
*Attorney, Agent, or Firm*—Hill, Van Santen, Steadman, Chiara & Simpson

[57] ABSTRACT

A method for a definitive fixing of the breadth of magnetic layers in the vicinity of the end face of a recording carrier, which breadth determines the track breadth, in which an integrated magnetic head structure is carried on a substrate and has a large number of thin magnetic, non-magnetic, insulating and electrically conductive layers stacked one upon an another, and in which originally broader magnetic layers are partially worn down by ion bombardment, the zones not to be worn down being first covered with a mask. Ion bombardment is carried out at right angles to the thin layers, i.e. at right angles to the plane of the substrate, with the mask suitably disposed.

2 Claims, 2 Drawing Figures

METHOD FOR THE PRODUCTION OF INTEGRATED MAGNETIC HEAD STRUCTURES

BACKGROUND OF THE INVENTION

1. Field of the Invention

The present invention relates to a method for producing an integrated magnetic head structure. More particularly, it relates to a method for definitively fixing the breadth of the magnetic layers in the vicinity of the end face to determine the track breadth of an originally broader magnetic layer structure of magnetic and non-magnetic, insulating and electrically conductive layers by ion bombardment.

2. Description of the Prior Art

A method of the type generally set forth above is disclosed in U.S. Pat. No. 4,016,601. Initially, the magnetic layers of an integrated magnetic head structure are also made wider in the region of the subsequent end plane than is necessary for the desired track breadth. Consequently, it is necessary to reduce the breadth of the magnetic layers at this point in a further operation, which operation must be carried out with great precision since mechanical access to the recording tracks must be more and more precise. In addition, to obtain optimum electro-magnetic efficiency it is important to keep the magnetic layers as broad as possible at the points at which they cover the stack of conductive layers for the formation of the magnetic head winding. Moreover, it is very difficult to produce structures that are only 20 $\mu$m or less in breadth by application of the corresponding materials by vapor deposition or sputtering with the aid of perforate masks and obtain sufficient precision.

For a better understanding of the prior art process, reference is made to FIG. 1 which is a diagrammatic illustration of an integrated magnetic head structure which comprises a large number of thin layers. The magnetic head winding 1 comprises electrically conductive and insulating layers, in alternation, together with the terminal connections 2 and is not of particular importance with respect to the invention. The magnetic layers which form the pole piece 3 and an invisible pole piece 4 disposed beneath the pole piece 3 and extending through beneath a magnetic head winding 1 are initially produced with a breadth L as far as the subsequent end plane 5 and continuing beyond that plane. It is only in a further operation that the breadth of the magnetic layers in the vicinity of the end plane 5 facing the recording carrier when in operation, i.e. the gap breadth, is reduced to the value l. In this connection, the known procedure is to fine-machine (polish) the end plane including the substrate, cover those zones that are not suppose to be worn down, by fitting a mask to the end plane, and bombarding the end plane with ions at right angles thereto. In this manner, the predetermined gap height should be maintained at least roughly to a distance T of at least 5 $\mu$m from the end plane.

The ionic bombardment causes the zones struck by the greatly accelerated ions to heat up a great deal. In order to avoid overheating of the sensitive magnetic layers, the magnetic head structure could be cooled during processing by placing the substrate on a water-cooled plate having excellent heat conduction properties. But this technique produces difficulties when the ion bombardment is carried out at right angles to the end face. Another problem arises in that the layers forming the pole pieces wear down at different rates. As a result, the magnetic layers and the insulating layers lying therebetween are worn down to different depths.

SUMMARY OF THE INVENTION

The object of the invention, therefore, is to provide measures which facilitate the cooling of the substrate during processing and eliminate the difficulties arising through the different rates of erosion of the magnetic and the insulating layers.

According to the invention, this object is achieved in that the ionic bombardment is carried out at right angles to the thin layers of the magnetic head structure, and thus also at right angles to the plane of the substrate, and through a mask which is suitably disposed, as will hereinafter become apparent.

The proposed techniques have the result that the subsequent processing of the pole ends according to the predetermined track breadth can be done at the same time in one operation on a large number of magnetic head structures which are disposed in lines and columns on a common substrate. It is only afterwards that the magnetic head structures are detached from the rest, individually or in sets (for making multi-track heads). Now the end faces are also ground and polished.

BRIEF DESCRIPTION OF THE DRAWINGS

Other objects, features and advantages of the invention will be best understood from the following detailed description, taken in conjunction with the accompanying drawings, on which.

DESCRIPTION OF THE PREFERRED EMBODIMENT

Figure 1:
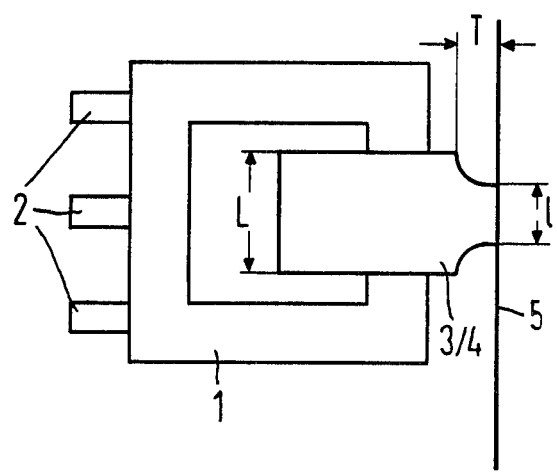
FIG. 1, as mentioned above, is a diagrammatic illustration of an integrated magnetic head structure which has a magnetic head winding and a pair of magnetic pole pieces.

As mentioned above, a magnetic head winding 1 comprises a plurality of electrically conductive and insulating layers stacked one upon the other to form the winding which has terminal connections 2. A pole piece 3 comprises a plurality of magnetic and non-magnetic layers, also in stacked relation, and passes through the magnetic head winding 1. A similar pole piece 4 is disposed beneath the pole piece 3. The pole pieces have an original breadth L and are subjected to ionic bombardment perpendicular to the plane 5 and through a mask for removing material back a distance T and producing an end face having a breadth l.

The same general structure can be advantageously produced by the techniques of the present invention in which a mask is disposed in a planar relation to the pole pieces and ionic bombardment is carried out through the mask and perpendicular to the planes of the thin layers.

Figure 2:
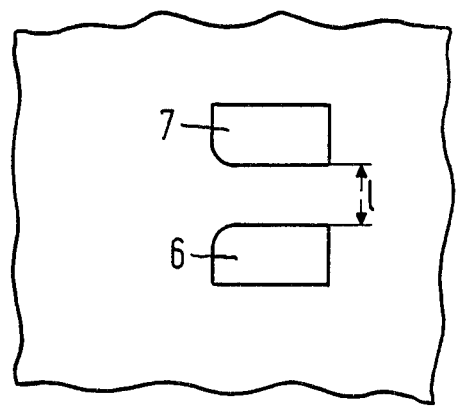
FIG. 2 is an illustration of a perforate mask for carrying out the process of the present invention.

FIG. 2 illustrates an exemplary perforate mask. The mask has a pair of holes 6 and 7 for each magnetic head structure being processed. The distance between the two holes 6 and 7 corresponds to the pre-determined track breadth l. Instead of using a perforate mask, one could also cover the entire magnetic head structure—with the exception of the zones to be worn down—with a titanium coating which remains largely unaffected by the ion bombardment when the erosion parameters are suitably chosen.

Although we have described our invention by reference to a particular illustrative embodiment thereof, many changes and modifications of the invention may become apparent to those skilled in the art without departing from the spirit and scope of the invention. We therefore intend to include within the patent warranted hereon all such changes and modifications as may reasonably and properly be included within the scope of our contribution to the art.

We claim:

1. In a process of producing a magnetic head structure in which a magnetic pole piece of alternate magnetic and non-magnetic layers has an end face milled by ion bombardment at right angles to the face, from an original breadth to a smaller breadth which determines the track breadth, the improvement for definitive fixing of the smaller breadth comprising the steps of:

masking the head structure perpendicular to the end face and parallel to the planes of the layers to expose areas to be removed; and bombarding the exposed areas through the mask at right angles to the planes of the layers.

2. The improved process of claim 1, wherein the step of masking is defined as coating the entire magnetic head structure, with the exception of the areas to be removed, with a titanium coating, and the step of bombarding the exposed areas is further defined as bombarding the coated head with ions to remove the magnetic material in the exposed areas.

* * * * *